No. 693,831. Patented Feb. 25, 1902.
J. A. BURROWS.
DEVICE FOR BRINGING TOGETHER THE ENDS OF SOLID RUBBER TIRES IN TIRE SETTING MACHINES.
(Application filed Apr. 29, 1901.)
(No Model.)

Witnesses:

Inventor:
Joseph A. Burrows,
by Humphry & Humphry,
Attorneys.

UNITED STATES PATENT OFFICE.

JOSEPH A. BURROWS, OF AKRON, OHIO.

DEVICE FOR BRINGING TOGETHER THE ENDS OF SOLID RUBBER TIRES IN TIRE-SETTING MACHINES.

SPECIFICATION forming part of Letters Patent No. 693,831, dated February 25, 1902.

Application filed April 29, 1901. Serial No. 57,988. (No model.)

*To all whom it may concern:*

Be it known that I, JOSEPH A. BURROWS, a citizen of the United States, residing at Akron, in the county of Summit and State of Ohio, have invented a certain new and useful Improvement in Devices for Bringing Together the Ends of Solid Rubber Tires in Tire-Setting Machines, of which the following is a specification.

My invention has relation to improvements in that class of devices used in connection with solid-rubber-vehicle-tire-setting machines to draw forward the rubber from each direction after the tire-wires have been joined to cover the wire-joint and unite the ends of the rubber.

The object of my invention is to provide a new and improved device of the character indicated that will squeeze the tire as it passes along it and press the fullness forward to the joint, while the tire will be partially raised from the channeled tire to permit the more complete operation of this part of the process.

To the accomplishment of this object my invention consists in the peculiar and novel construction, arrangement, and combination of parts hereinafter described and then specifically pointed out in the claims, reference being had to the accompanying drawings, which form a part of this specification.

Figure 1:
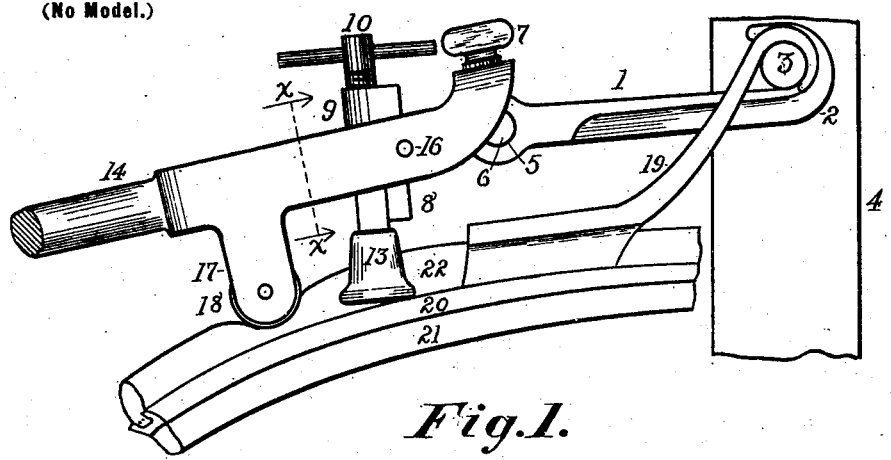
Figure 2:
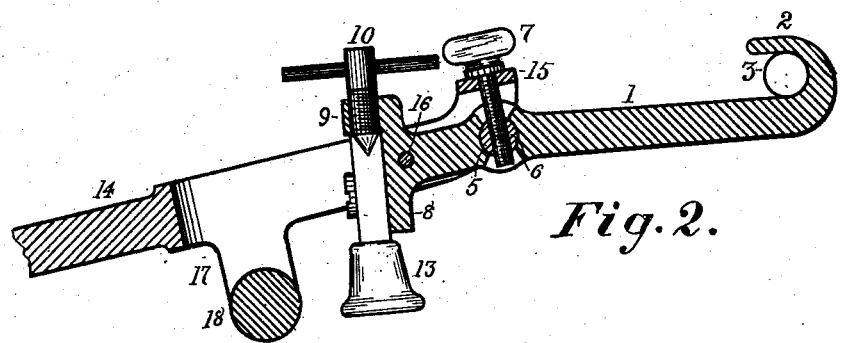
Figure 3:
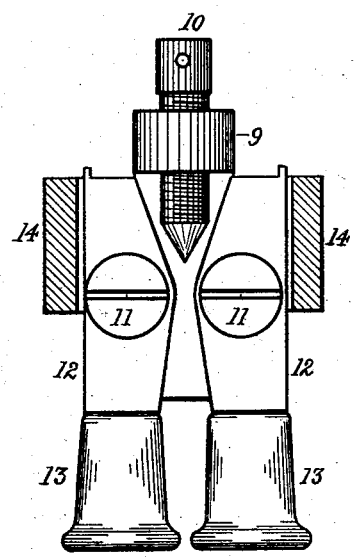

In the accompanying drawings, in which similar reference-numerals indicate like parts in the different views, Figure 1 is a side elevation of my device with a portion of a wheel felly and tire to illustrate its application; Fig. 2, a vertical longitudinal section of the same, and Fig. 3 a section enlarged at the line *x x* of Fig. 1.

Referring to the drawings, 1 is a metallic arm having at the right end a hook 2 to engage an anchor-pin 3 on a post 4 or other convenient support. Near the center of the arm is a transverse hole 5, in which is fitted to turn a short shaft 6, through the center of which is a transverse screw-threaded opening in which is fitted to turn a thumb-screw 7. Above and below the shaft 6 the arm 1 is cut with slotted openings that intersect the opening for the shaft above and below to permit the passage of the screw 7.

On the front or left end of the arm 1 is an integral plate 8, slightly inclined backward at the top from a perpendicular and having at the top a forwardly-projecting lug 9, in which is a vertical screw-threaded opening, in which is fitted to turn a screw 10 with a conical end.

Pivotally mounted on the face of the plate 8 by means of screws 11 are two oppositely-disposed bars 12, with their upper adjacent faces beveled outward and arranged to receive the pointed end of the screw 10 between them and to be thereby rocked outward.

The lower ends of the bars 12 are reduced and turned to form wrists, on which are freely mounted rollers 13, retained by washers (not shown) riveted on the ends of the wrists.

The rollers 13 are somewhat bell-shaped, with the bottom edges rounded and tapered toward the top.

The plate 8 rests in a rectangular loop of a lever 14, the right end of the loop being a cross-bar 15, in which a screw 7 freely fits.

The arm 1 is pivotally secured in the recess of the lever 14 by a pin 16. From each side of the recess of the lever 14 depend short integral branches 17, between which is journaled a roller 18. Adapted to engage the anchor-pin 3 on each side of the arm 1 are hooked arms 19, each bearing at its lower end a blade bent to enter the channeled tire 20 on the felly 21 and pass partially under the rubber tire 22 from each side.

In operation a wheel bearing the channeled tire 20 and rubber tire 22, the wires of which have been united, is mounted or supported to partially or wholly revolve, so as to bring the rubber tire in such relation to the machine that the blades on the arms 19 may be passed partially under the rubber tire from each side and the roller 18 press its surface and the rollers 13 its sides in the position shown in Fig. 1. The wheel is then turned slowly, so as to bring the joint in the rubber tire from the right toward the rollers 13. In this process the blades on the arms 19 tend to slightly raise the tire from the channel, while the rollers 13 press its sides. It will be noticed that the bottom plane of the rollers 13 is at a pronounced angle with the periphery of the metal tire 20 instead of being tangential, the object of which is to cause them to slightly raise the tire from the rim as they press its sides, thus carrying the fullness of the material toward the joint.

The rollers 13 may be adjusted to bear lightly or more firmly against the sides of the tire by means of the screw 10.

While the operation just described is performed the roller 18 presses on the outer periphery of the tire and also forces the fullness of the material toward the joint, the pressure of the roller being regulated by the operator by means of the lever 14. The relative degree of depression of the roller 18 with reference to the rollers 13 will also be regulated by the screw 7 to secure the best results in the use of the machine.

I do not claim as my invention the following subject-matter: first, in a rubber-tire-setting machine a pair of rollers for clamping the rubber tire and a grooved roller mounted at a right angle to the other rollers and on a line between them for holding the rubber tire in the channel-iron; second, in a rubber-tire-setting machine a pair of rollers for clamping the rubber tire, means for carrying said rollers, a grooved roller mounted at a right angle to the other rollers and on a line between them, means for carrying said roller, and means for adjusting the position of said roller with relation to the clamping-rollers, and, third, in a rubber-tire-setting machine a pair of oppositely-pivoted blocks with oppositely-inclined faces at one end, oppositely-located clamping-rollers mounted on the other end of said blocks, a movable wedge-shaped block between the inclined faces of said roller-carrying blocks, and means for actuating said wedge-shaped block.

Having thus described my invention, what I claim, and desire to secure by Letters Patent, is—

1. In a device of the class designated, the combination with an arm adapted to be secured to a fixed object, of the two bars bearing bell-shaped rollers to engage the sides and lower corners of the tire, and a lever pivotally attached to said arm and bearing a roller to press the periphery of said tire adjacent to said bell-shaped rollers, substantially as shown and described.

2. In a device of the class designated, the combination with a lever pivotally attached to an arm, arranged to be anchored against movement with the wheel, of oppositely-disposed bars bearing bell-shaped rollers to engage the opposite sides of the tire, a roller carried by said lever and arranged to press the face of said tire and curved blades anchored against movement with said tire, and arranged to run along the sides and partially under said tire, substantially as and for the purpose specified.

In testimony that I claim the above I hereunto set my hand in the presence of two subscribing witnesses.

JOSEPH A. BURROWS.

In presence of—
C. P. HUMPHREY,
C. E. HUMPHREY.